United States Patent
Maurer (10) Patent No.: US 7,180,420 B2
(45) Date of Patent: Feb. 20, 2007

(54) SYSTEM AND METHOD USING TRIANGULATION WITH RF/LF AND INFRARED DEVICES FOR TRACKING OBJECTS

(75) Inventor: Mike Maurer, Woodbury, NJ (US)

(73) Assignee: MGM Computer Systems, Inc., Woodbury, NJ (US)

(*) Notice: Subject to any disclaimer, the term of this patent is extended or adjusted under 35 U.S.C. 154(b) by 448 days.

(21) Appl. No.: 10/853,396

(22) Filed: May 25, 2004

(65) Prior Publication Data

US 2005/0264416 A1   Dec. 1, 2005

(51) Int. Cl.
  G08B 23/00   (2006.01)
  G08B 13/181  (2006.01)
  H04B 14/04   (2006.01)

(52) U.S. Cl. .............. 340/572.1; 340/573.1; 340/573.4; 340/572.8; 340/572.9; 340/539.16; 340/311.1; 340/825.72; 455/150.1; 455/151.1; 455/517; 455/456

(58) Field of Classification Search ............. 340/572.1, 340/572.8, 572.9, 573.1, 573.4, 825.44, 825.34, 340/311.2, 539.16; 455/150.1, 151.1, 456, 455/517
See application file for complete search history.

(56) References Cited

U.S. PATENT DOCUMENTS

| 6,104,295 | A | 8/2000 | Gaisser et al. |
|---|---|---|---|
| 6,154,139 | A | 11/2000 | Heller |
| 6,574,482 | B1 | 6/2003 | Radomsky et al. |
| 6,674,403 | B2 | 1/2004 | Gray et al. |
| 6,838,992 | B2 * | 1/2005 | Tenarvitz ............ 340/573.1 |
| 2003/0235172 | A1 | 12/2003 | Wood |

OTHER PUBLICATIONS

Web page—Visonic Technologies—About Us, Visonic Technologies, Enterprise Protection Solutions, Subheadings—Enterprise Solutions for Security, Safety and Communication, Meeting the Needs of a Diverse Market and Global Presence, ELPAS Overview, System Architecture—Elpas Four Basic Levels, pp. 1-5.

(Continued)

*Primary Examiner*—Jeffery Hofsass
*Assistant Examiner*—Lam Pham
(74) *Attorney, Agent, or Firm*—Knoble Yoshida & Dunleavy, LLC (57) ABSTRACT

The invention involves the usage of radio frequency, infrared, and low frequency radio frequency to accurately track transponders (tags) that are placed on objects. Transponders about the size of a small watch or a badge that can be worn on a lapel or pocket are used. The transponders are attached to staff, assets, and/or patients. Typically, ceiling mounted readers are used. The system utilizes the readers to triangulate the position of the transponders. The transponders can triangulate to a resolution accuracy of a couple of inches to 10 feet within 4 seconds. The system is also capable of triangulating the position of tags when they are lost to IR using RF. The system works with vector floor plans (AutoCAD or Microstation). This enables the system to function so that detail doesn't deteriorate even with large areas (100,000 square feet to unlimited miles). This enables accurate reading of room labels to quickly identify exact location of tags.

35 Claims, 6 Drawing Sheets

OTHER PUBLICATIONS

Web page—Healthcare Security: Resident Wandering; RoamAlert Plus Resident Wandering Protection System, Maximum Wandering Protection with Minimum Staff Interruption; eXI Systems, System Overview, pp. 1-2.

Web page—Versus Technology, Inc.—Your Source for Real-Time Locating Systems, Badges and Tags, Sensory Network Components, Auto Assignor, Viewing Software, Reporting Software, pp. 1-5.

* cited by examiner

SYSTEM AND METHOD USING TRIANGULATION WITH RF/LF AND INFRARED DEVICES FOR TRACKING OBJECTS

BACKGROUND OF THE INVENTION

1. Field of the Invention

The invention relates to the field of systems and methods for tracking and locating objects. In particular the invention relates to providing a triangulation system for RF/LF devices and infrared devices, thereby enhancing locating abilities.

2. Description of the Related Technology

Keeping track of people and assets in buildings is of critical importance in some industries. An example of an industry where this is critical is in the healthcare industry.

Hospitals need to monitor the presence of patients, employees, and equipment. A patient afflicted with a mental illness, or Alzheimer's disease can sometimes prove to be a tremendous problem to hospital staff and administrators. Sometimes these patients wander from their rooms potentially causing harm to other patients, and to themselves. Losing track of a patient can cause loss of life and possibly debilitating lawsuits. A lost patient for a hospital is not the only potential hazard that exists.

Hospitals also use costly equipment and supplies. Sometimes during an emergency procedure this equipment needs to be found in a hurry. However, sometimes equipment is not where it should be, or has disappeared altogether. Time spent searching for lost equipment can cost a patient much needed attention. Furthermore, replacement costs for stolen equipment also drains a hospital of resources that could be utilized elsewhere.

Previous methods for determining the location of patients and assets have attempted to provide tracking and locating capability, but have fallen short in providing highly accurate, real-time tracking capability. Some prior systems are discussed below.

U.S. Patent Application No. 20030235172 to Wood discloses a system for tracking assets. The system is used in a hospital in order to track assets of the hospital. The system uses asset tags attached to an item. RF pulses are transmitted by nodes and asset tags. Various access points receive the pulses. The item's location is resolved using triangulation.

U.S. Pat. No. 6,674,403 to Gray et al. discloses a wireless method of real-time position detection and motion tracking. The system uses a digital map in order to view the item tracked. It is suggested that the map may be made using CAD tools. The system uses received signal strength indicator data from one or more access points located in the mapped area in order to receive the wireless communication signals (RF signals). These signals can be triangulated in order to determine position within the mapped area.

U.S. Pat. No. 6,574,482 to Radomsky et al. discloses a dual infrared and RF transmitter. It is suggested that the device can be incorporated into a portable badge. Received signal strength indicators are used to determine the position of the transmitter within an environment.

U.S. Pat. No. 6,154,139 to Heller discloses a system for locating subjects within a tracking environment. The system may also be used with equipment. The system uses both RF and IR signals that are transmitted from badges.

U.S. Pat. No. 6,104,295 to Gaisser et al. discloses using an electronic band tag that stores ID information. The system uses IR and RF signals within a hospital environment in order to monitor patients and equipment.

Although the prior art systems enable tracking of objects, levels of accuracy may vary. Some of the prior art systems do not factor in various variables that may occur during the tracking of an object, and therefore, by neglecting to provide various methods of tracking items, can fail to provide the most accurate determination of an objects location.

Therefore, there exists a need in the field for providing an improved system and method for accurately determining the location of an object within an area

SUMMARY OF THE INVENTION

Accordingly, there exists a need to provide an improved system and method for more accurately determining the location of an object within an area and rapidly responding to emergency situations.

According to a first aspect of the invention, a system for tracking objects having a transponder attached to an object is disclosed. The transponder emits RF (radio frequency) signals, LF (low frequency) signals, and infra-red signals. The system has an RF signal reader for detecting emitted RF signals from the transponder. The system also has an LF signal reader for detecting emitted LF signals and an infra-red signal reader for detecting emitted infra-red signals. A computer is provided in the system that is enabled to receive transmissions from the RF signal reader, the LF signal reader, and the infra-red signal reader. The computer uses the received transmissions to triangulate a location of the object.

According to a second aspect of the invention, a system for tracking objects is disclosed that has transmitting means attached to an object that emits RF signals, LF signals, and infra-red signals. The system has RF signal detecting means for detecting emitted RF signals, LF signal detecting means for detecting emitted LF signals and infra-red signal detecting means for detecting emitted infra-red signals. The system also has transmission means for transmitting detected signals from the RF signal detecting means, the LF signal detecting means, and the infra-red signal detecting means to a computer and triangulation means for triangulating the detected signals.

According to a third aspect of the invention, a method for tracking objects is disclosed having the steps of first attaching a transponder to an object. The attached transponder emits RF signals, LF signals, and infra-red signals. Then an RF signal reader for detecting emitted RF signals in an area is provided. Then an LF signal reader for detecting emitted LF signals in the area is provided. Then an infra-red signal reader for detecting emitted infra-red signals in the area is provided. A signal emitted from the transponder is detected at a plurality of readers. The readers transmit data indicating a detected signal from the plurality of readers to a computer. Then the step of triangulating a location of the object using the data transmitted to the computer is performed.

According to a fourth aspect of the invention, a system for tracking objects is disclosed having a transponder attached to an object, wherein the transponder emits RF signals, and infra-red signals. The system further has a RF signal reader that detects emitted RF signals and an infra-red signal reader that detects emitted infra-red signals. The system also has a computer enabled to receive transmissions from the RF signal reader, and the infra-red signal reader in order to determine a location of the object. The computer further comprises boundary recognition means for determining a location of the object.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described embodiments of the invention.

DETAILED DESCRIPTION OF THE PREFERRED EMBODIMENT(S)

The object tracking system of the instant invention utilizes a combination of radio frequency, diffused infrared, and low frequency radio frequency to accurately track object tags. Typically an object to be tracked has a transponder attached to it. The transponder can be in the form of a badge, a bracelet, a pull-away necklace, or in a shape more conducive to attachment to equipment. The transponder can be used for a variety of scenarios.

One scenario is a wireless panic alert. The badge transponder (tag), having a panic button, is worn by a staff member and reflects the exact location of staff needing assistance. By pressing the panic button appropriate staff can respond rapidly. The security staff sees the alert on a floor plan that zooms in close enough to quickly isolate site/campus, building, floor, and exact location. Using a vector graphics displayer, even huge floor plans in multi-building sites can be zoomed in upon to see extensive detail—even room labels can be read on surrounding rooms.

Another scenario involves asset tracking. Transponders (tags) are attached to assets for real-time monitoring of location. The history of equipment moves can be stored in a database. Assets may also be quickly located when needed for operational tasks, and for quick access to equipment for preventive maintenance, etc.

Another scenario involves tracking visitors. The location of visitors may be monitored at all times and staff may be alerted when they enter a secure area. Transponders (tags) may be attached to visitor assets brought into your facility to see that they are removed after exiting or to monitor their location. Transponders additionally have infrared tamper sensors to ensure visitors don't remove transponders without security knowing.

Another scenario involves tracking a wandering patient. Transponders worn by Alzheimer's patients, or mentally impaired patients can trigger various events (e.g. door lock down, staff notification showing exact location of patient, camera turned on, etc.). Transponders can be worn under clothing to maintain patient privacy/HIPAA compliance.

Another scenario involves patient tracking. A chronology of a patient's visit from the time they arrive at the monitored area to the time they leave a monitored area may be tracked. Tickler timers in the computer can be attached to workflow processes to ensure that nothing falls through the cracks, or that a patient is being properly attended to. A status board interfaced with other hospital systems will assist staff in cycling patients through facilities effectively. Using diffused infrared readers over beds in an open Emergency Department, the system can determine how much time specific staff spent with each patient. Patient tracking can also be integrated with other hospital systems such as Nurse call, ADT (registration census system), Lab system, Radiology, Pharmacy, etc.

Another scenario involves tracking a visiting physician. The system can be used to track volunteer time spent in a hospital facility and reporting to JCAHO. The system can also determine how much time was spent in each area and can turn off in certain areas delineated as off-limits to tracking. The system can also be integrated with a time and attendance system.

Another scenario involves tracking babies. Business rules are established that link mother and baby transponders to ensure that only the mother and/or authorized staff escorts a baby. This eliminates baby mix-ups or unauthorized removal of an infant from a facility.

Another scenario involves tracking outside transponders. By using outside antennas, the location of transponders placed on students, staff, assets, or patients can be determined. Panic buttons can also be used in this scenario. Engineers in a refinery could quickly notify appropriate safety personnel when there are safety concerns. Built-in motion detectors in the transponder (tags) can cause the system to alert when engineers are down for a specified time period. This application scenario can be used in a prison environment, shipboard use, trailer and train yards, etc.

Another scenario is hostage/response team tracking. During a bank robbery an employee can press their panic alert button. The system can locate all personnel in that area and automatically map their move history if taken hostage. The SWAT team, carrying the small triple technology transponders (RF, IR, LFRF), are tracked for strategic planning and eliminate crossfire risk. The system can also track their weapons to ensure they are returned when the situation is diffused.

Another scenario involves being used aboard ships. Usage of the system could quickly locate all personnel during a man overboard alert, ensure all crew are evacuated from a compartment during a catastrophe, such as fire, to minimize spread to other compartments, location of a security breach, locate critical munitions, aircraft parts, etc.

Figure 1:
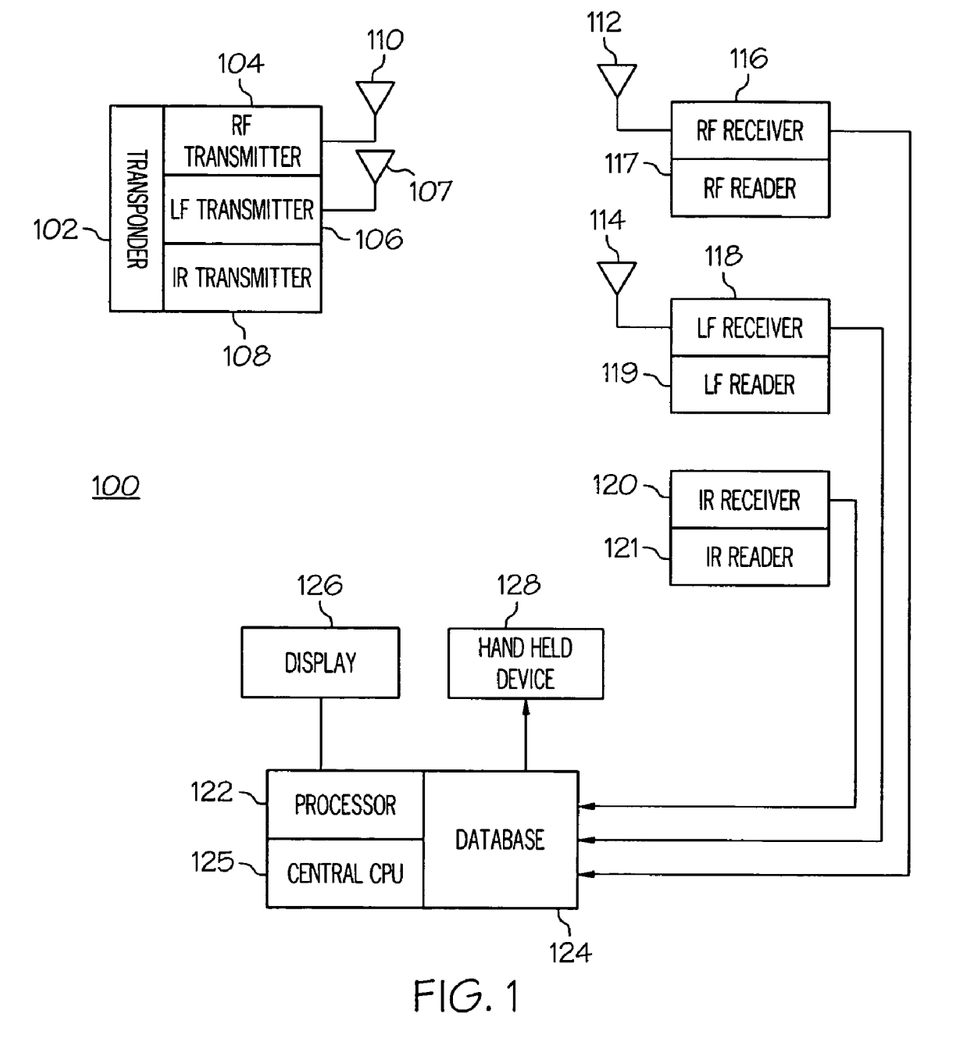
FIG. 1 shows a block diagram depicting a tracking system using RF/LF and infrared.

Referring now to FIG. 1, a block diagram showing the components utilized in the object tracking system 100 is shown. Object tracking system 100 is compatible with over 32,000 Weigand devices to accommodate existing technologies within hospitals (e.g. access control, CCTV, paging systems, etc.). Transponder 102 is a Triple technology tag constructed with an RF transmitter 104, an IR transmitter 108, and an LF transmitter 106. Transponder 102 can be attached to a patient, a member of the staff, or to an asset, such as equipment or supplies. Transponder 102 can be embedded into a bracelet device when attached to a patient, or staff and can emit a signal when removed from the wearer of the bracelet. Additionally, transponder 102 can be attached to an asset in much the same manner as the bracelet. This prevents removal of transponder 102 without notification to the system monitors when it is not desirable to have transponder 102 removed. Transponder 102 can also be in the form of a badge, or other device worn by an individual.

Transponder 102 ideally has low power consumption to maximize battery life and cost. Typically, field replaceable batteries (90 seconds or less—0.50 per battery) will be used.

Transponder 102 can also be enabled to provide low battery alerts for advanced warning of impending battery failure. Alternatively, transponder 102 may have other energy saving mechanisms, such as solar cells, or motion detecting mechanisms in order to conserve battery power.

Additionally, transponder 102 can have a panic button that can be depressed by a member of the staff or a patient in the event of an emergency. Pressing the panic button can send immediate notification to the monitors, or to security, that assistance is needed. Transponder 102 can function as a silent Panic Alert/Locator system wherever transponder 102 may be in a hospital or any other facility. Transponder 102 can also keep track of time and attendance. The button can be used to automatically log staff into the system when passing through an entrance portal. It could also be utilized to keep track of equipment usage and availability. The buttons can also be linked to switches to track equipment readiness (e.g. occupied/available, in-use/available, etc.).

IR transmitter 108, located on transponder 102 emits a signal in the infrared range that can be picked up by an infrared receiver 120, which is part of IR reader 121. Using diffused infrared readers 121 over each bed, accuracy can be increased to know which patient is in the bed, whether a bed is occupied, and which members of the staff are with that patient (automatically captures the full chronology of processes and their time with that patient). Although, IR transmitter 108 can give accurate information as to a transponder's 102 location, the infrared emissions from IR transmitter 108 can be blocked easily. Therefore, in order to keep accurate track of an object's location it is necessary to incorporate additional transmitters.

A transponder 102 hidden deep in a pocket may still be located by object tracking system 100 due to RF transmitter 104 and LF transmitter 106. The ability to pick up concealed transmissions is also desirable in an institution where privacy may be important. RF transmitter 104 transmits in a frequency range of 433 MHz and 933 MHz, while LF transmitter 106 transmits in a frequency range of 30 KHz to 300 KHz. The RF signal is emitted via antenna 110 and is picked up via antenna 112 attached to RF receiver 116. Antenna 112 and RF receiver 116 are part of RF reader 117. LF signal is emitted via antenna 107 and is picked up at LF receiver 118 via antenna 114. LF receiver 118 and antenna 114 are part of LF reader 119.

Ceiling mounted RF readers 117 may be mounted from 20–60 feet apart within a structure. However, most preferably, readers 117 are mounted from 35–45 feet apart within a structure. When spaced approximately 40 feet apart, an accuracy within inches to 10 feet may be obtained. The object tracking system 100 utilizes floor-to-floor logic to differentiate between floors. Using transponder 102 and receiver 116, software, developed using .NET, can triangulate to a resolution accuracy of 2" to 10' within 4 seconds. This enables accurate locating of a tagged object in large areas and in long hallways.

LF reader 119 may be mounted near entrances and exits. Low Frequency readers 119 can detect rapid movement in an area and react quickly to create trigger events (e.g. lock doors down, turn on video cameras, page staff or security, etc). When LF readers 119 are placed before and after exits and entrances, direction can be determined. When further coupled with triangulation, a path can be developed for an object. This information can then be used for tracking assets and for time efficiency management.

LF reader 119 and RF reader 117, as well as IR reader 121 are ideally "intelligent." The readers ideally have a microprocessor and associated memory in order to trigger specialized events when a transponder 102 having a certain identification code passes a certain reader. Movement history is used to calculate velocity to indicate whether a patient is fleeing. Also, the receipt of an emitted signal from a transponder 102, such as when a panic button is pressed, or simply from passing a specific reader, may automatically trigger an event. The event triggered may be an alarm sounding, an automatic lock down, etc. "Intelligent" readers can minimize response times in the event of an emergency. They can also provide redundancy to ensure that an emergency event is always handled in the event that central computer 125 has malfunctioned.

The data received by RF reader 117, LF reader 119, and IR reader 121 can then be transmitted to a central computer 125. Transmissions from LF reader 119, IR reader 121, and RF reader 117 are used in determining a location of a transponder 102 by central computer 125. Central computer 125 has a processor 122 and database 124 and display 126 associated with it. Processor 122 performs calculations using the data from the transmissions. The received transmissions from RF reader 117 are used to triangulate a position of a transponder 102. The transmission from transponder 102 further contains an identification code. Information related to the identification code is stored in database 124. Using the identification code and related transmission data, an accurate determination of a transponder's 102 location can be made by central computer 125.

Database 124 can also store information related to previous locations of transponder 102. Additionally, data received at RF reader 117, LF reader 119, and IR reader 121 may be time-stamped at the readers, or may be time-stamped upon receipt of a transmission at central computer 125. This information can be stored and arranged in database 124 in order to create numerous reports related to the object to which transponder 102 has been attached. Examples of reports that can be made are inventory lists, inventory usage reports, patient treatment reports, staff treatment reports, reports reporting frequent alarm triggering events, etc.

Central computer 125 operates with vector floor plans (AutoCAD or Microstation) that are shown on display 126. Central computer 125 can also act as a server providing object locating data to client computers located throughout the monitored area. Vector floor plans enable a person monitoring a floor plan to keep track of object tracking data in real-time. The vector plans enable a monitor to zoom in or out on a particular spot of interest. When using a vector floor plan, room names and labels can be accurately read despite the zooming and retreating (scaling) of the floor plan on the display.

When using the floor plan, signals received at certain readers correspond to exact points indicated on the floor plans. IR readers 121 may be placed in certain areas, or rooms, and are correspondingly noted in the floor plan. This is also done with RF reader 117 and LF readers 119. Boundaries, representing rooms, corridors, or zones, marked on the floor plan are correlated with logic used by processor 122. Upon detection of a transponder 102 in a certain location, the central computer 125 will determine which boundary (room, corridor, or zone) transponder 102 falls within, using 'Intelligent Boundary Recognition—IBR', and will display that result in a report format (textually) or graphically on the floor plan. Additionally, signals received from certain readers may take priority over signals received by other readers, and an improved determination of the location of an object may be achieved. If an IR receiver 120 receives a signal from transponder 102 in a certain room, and RF receivers 116 also receive signals placing the same transponder 102 in a hallway adjacent to the room. The data from IR receiver 120 will be given priority due to the higher accuracy of IR transmitter 108. Correspondingly, the floor plan will indicate that the object is in the room instead of the hallway. However, in the event that it appears that further received signals indicate transponder 102 is moving from a defined area, priority will then be given to the signals received at RF receivers 116, or LF receivers 118. Giving priority to signals received by certain receivers at certain readers provides a higher degree of accuracy when pinpointing the location of a transponder 102. Additionally, readers may periodically calibrate to fixed tags placed within close proximity to adjust for environmental conditions and thereby maintain the highest levels of accuracy.

Object tracking system software is written in .NET to provide access via the most common internet browsers and accommodate portable computing devices. The software can be accessed from a common browser to eliminate the loading of custom software on desktops and/or portable computing devices (hardware independent). This further enables the system to be easily scalable to the environment that needs to be monitored.

Another device that can be utilized with object tracking system 100 is a hand held device 128. Hand-held device 128 may receive signals via central computer 125, or alternatively, signals may be transmitted directly to hand held device 128 in order to provide mobile tracking of an object. In the event that signals are received via central computer 125, hand held device 128 will have a version of the vector floor plan displayed on a screen and the location of the tracked object will be displayed on the screen. Alternatively, a textual equivalent of the location, indicating a room or certain area may be displayed on screen. This enables staff to track an object that may be a fleeing patient or a lost piece of equipment. Hand-held device may also have receivers built-in to verify distance from a tracked object and may provide an audio signal when within a certain range of an object.

Figure 2:
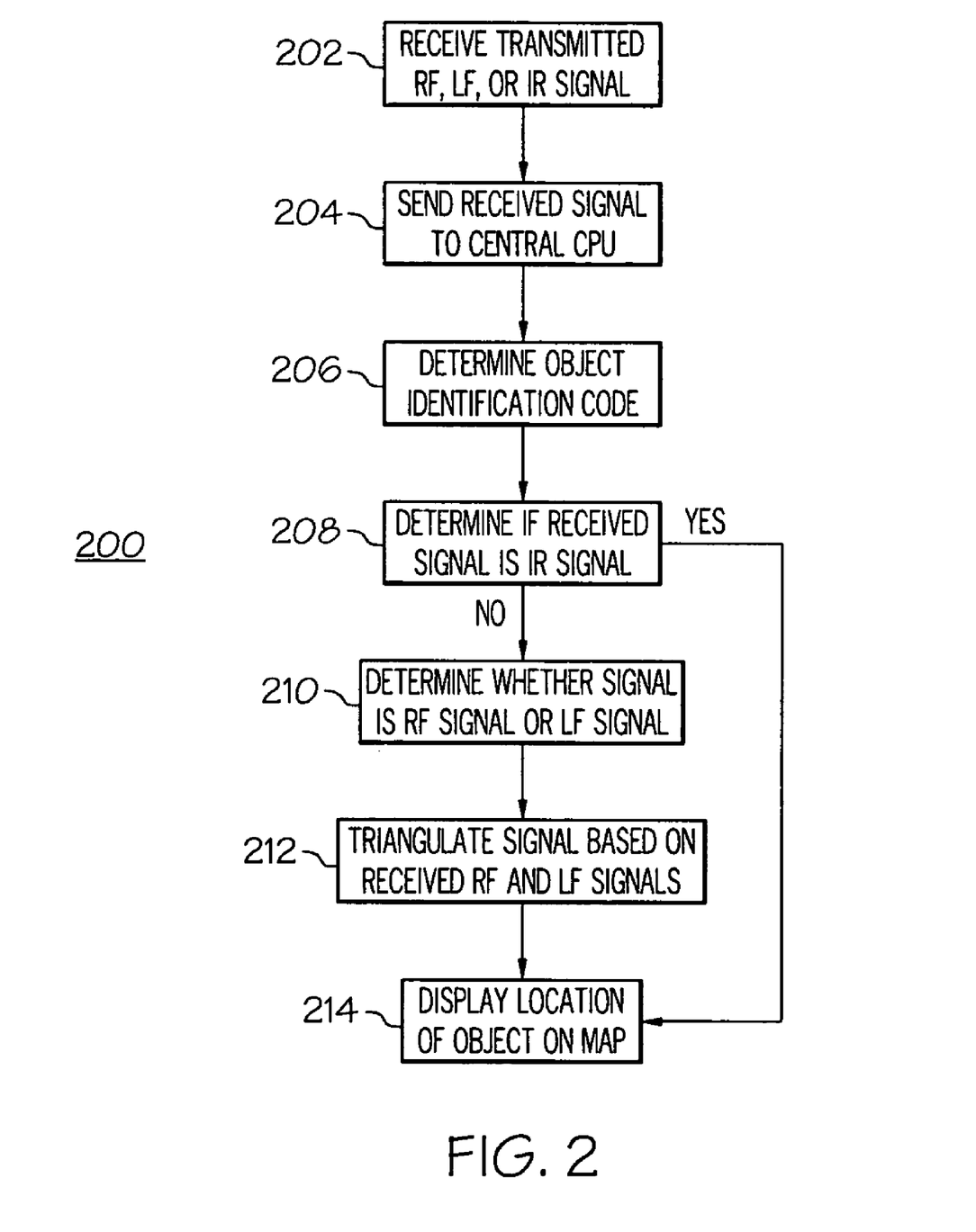
FIG. 2 shows a flow chart of the method for tracking an object using RF/LF and infrared technology.

FIG. 2 shows a flow chart of object tracking method 200. At step 202 a reader receives a signal emitted from transponder 102. RF transmitter 104 emits an RF signal via antenna 110 and may be picked up via antenna 112 attached to a RF receiver 116. LF signal is emitted via antenna 107 and may be picked up at LF receiver 118 via antenna 114. IR transmitter 108 emits a signal in the infrared range and IR receiver 120 may pick up the signal.

At step 204 the received signal is sent to central computer 125. The received signal may contain information, such as signal strength, time received, an identification code, type of signal, etc. The received signal is transmitted to central computer 125 by a cable connected to a LAN (Local Area Network), however; it is possible that the data may be transmitted over a WI-FI network, or similar communication method.

At step 206 central computer 125 processes the data from the received signal at processor 122. The object identification code can be determined from the received signal. The identification code is used to pull up information related to the tagged object. The identification code will correspond to the transponder 102. Information stored related to transponder's 102 identification code may be patient's name, patient's condition, whether or not patient is a flight risk, equipments name, usage information related to equipment, last user of equipment, staff member's name, visitor's name, etc. The identification code can also be used to pull up corresponding data related to tracking movement and the past detected received signals.

At step 208, central computer 125 determines if the received signal is an IR signal. If it is not an IR signal then the method proceeds to step 210. If it is determined that the signal is an IR signal then it is possible to move directly to step 214. However, it is possible to additionally include another step related to quality control based upon past performance of IR reader 121. If infrared reader 121 had previously provided incorrect information, it may be prudent to await the receipt of other data. Alternatively, a user of object tracking method 200 may want to receive a plurality of signals before displaying a location of an object on a map, or floor plan.

At step 210, central computer determines whether the received signal is an RF signal or an LF signal. Determining which type of signal it is assists in either triangulating the location of transponder 102, or setting trigger event, as well as assisting with overall determinations of how to prioritize the signal. LF takes precedent in the case of alert event triggers (e.g. door lock-down, staff notification, camera activation for visual verification, etc.).

At step 212 the signal is triangulated. By triangulating the signal from transponder 102, central computer 125 is able to accurately locate an object with a degree of certainty that had previously not been obtainable in environments such as hospitals. Utilizing past received signals from other receivers it is possible to pinpoint with a high degree of accuracy, from within inches to 25 feet in less than 4–5 seconds, where a transponder 102 is located.

At step 214, the location of transponder 102 will be displayed on display 126, or alternatively on hand held device 128. The location of an object with a transponder 102 is displayed on a vector floor plan or textually on a portable computing device (e.g. hand held).

Figure 3:
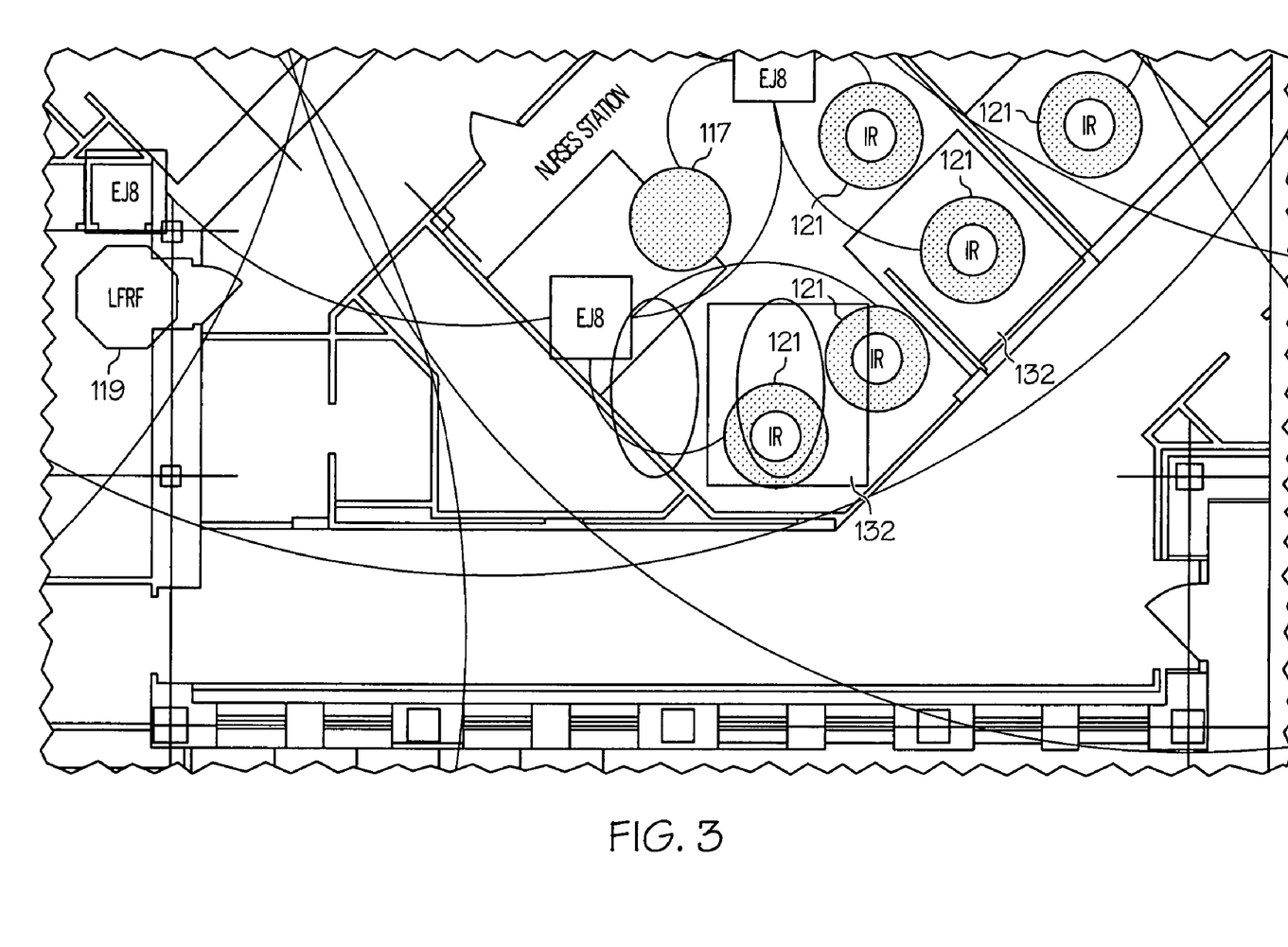
FIG. 3 shows a floor plan with IR readers over hospital beds.

FIG. 3 shows part of a floor plan from a hospital that displays a portion of the object tracking system for Lourdes Hospital. In this example, Elpas® hardware was used, although it is to be understood that the type of hardware use can vary based upon the needs of the system. IR readers 121 are placed over each bed 132. In this example, IR readers 121 are being used to differentiate which patient is in which bed 132, and which of the staff members are working with the patients. Through programming, three thresholds are established for each IR reader 121: 1) a 5' radius around the bed informs the system as to what patient is in bed and if a staff member is captured within that radius, then that staff member's time is captured with that patient, 2) the system determines if a transponder is not in bed 132 but still in that particular room, and 3) the system determines if a transponder has left that room. LF (LFRF) readers 119 are located before and after each exit/entrance to determine when a transponder has left that area and in which direction the transponder is traveling. LF readers 119 can react fast enough (detect tags moving up to 100 mph through LF reader's 119 narrowed zone—2' to 10' tweakable diameter) to lock doors down, page designated staff, turn on CCTV camera, etc.

Figure 4:
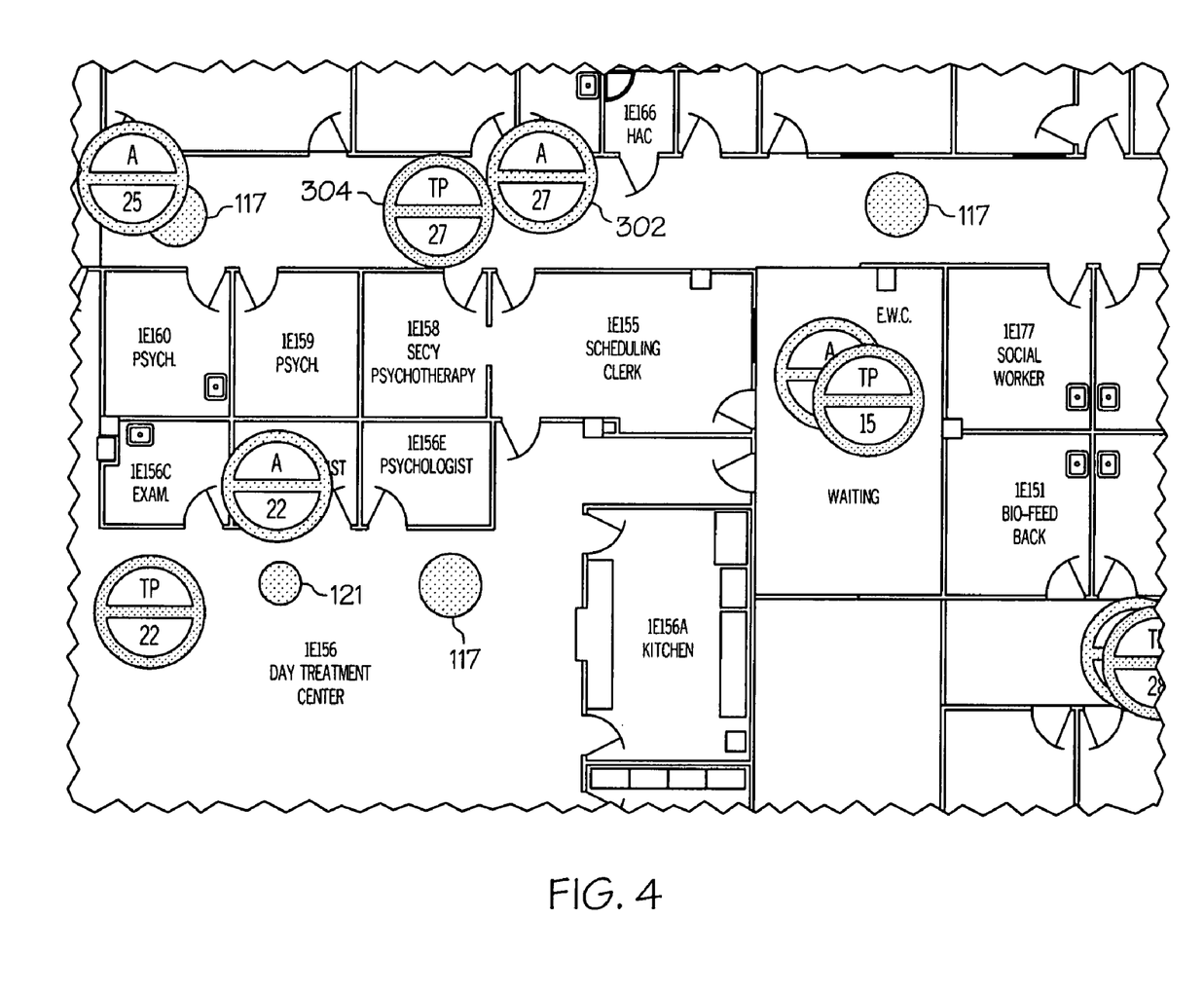
FIG. 4 shows a floor plan displaying sample test data.

FIG. 4, shows an example of a vector floor plan 300, used for trial purposes in a Miami VA Hospital. Vector floor plan 300 is a close up view of a portion of a larger floor plan. RF readers 117 are shown located between roughly 40 to 60 feet apart. IR reader 121 is shown located at a certain exit/entrance. IR, in this particular example, is used for floor-to-floor logic. LF may be preferable for this purpose and also to quickly detect rapid movement within its area of coverage (2' to 10') to respond to trigger events (e.g. door lock-down, camera activation, staff page, etc.). In this view an LF reader is not shown. Vector floor plan 300 shows a circle labeled "TP" 304 that represents a test spot where someone pressed a panic button on transponder 102. The circle labeled "A" 302 represents where central computer 125 indicated the location of transponder 102 was on vector floor plan 300.

Figure 5:
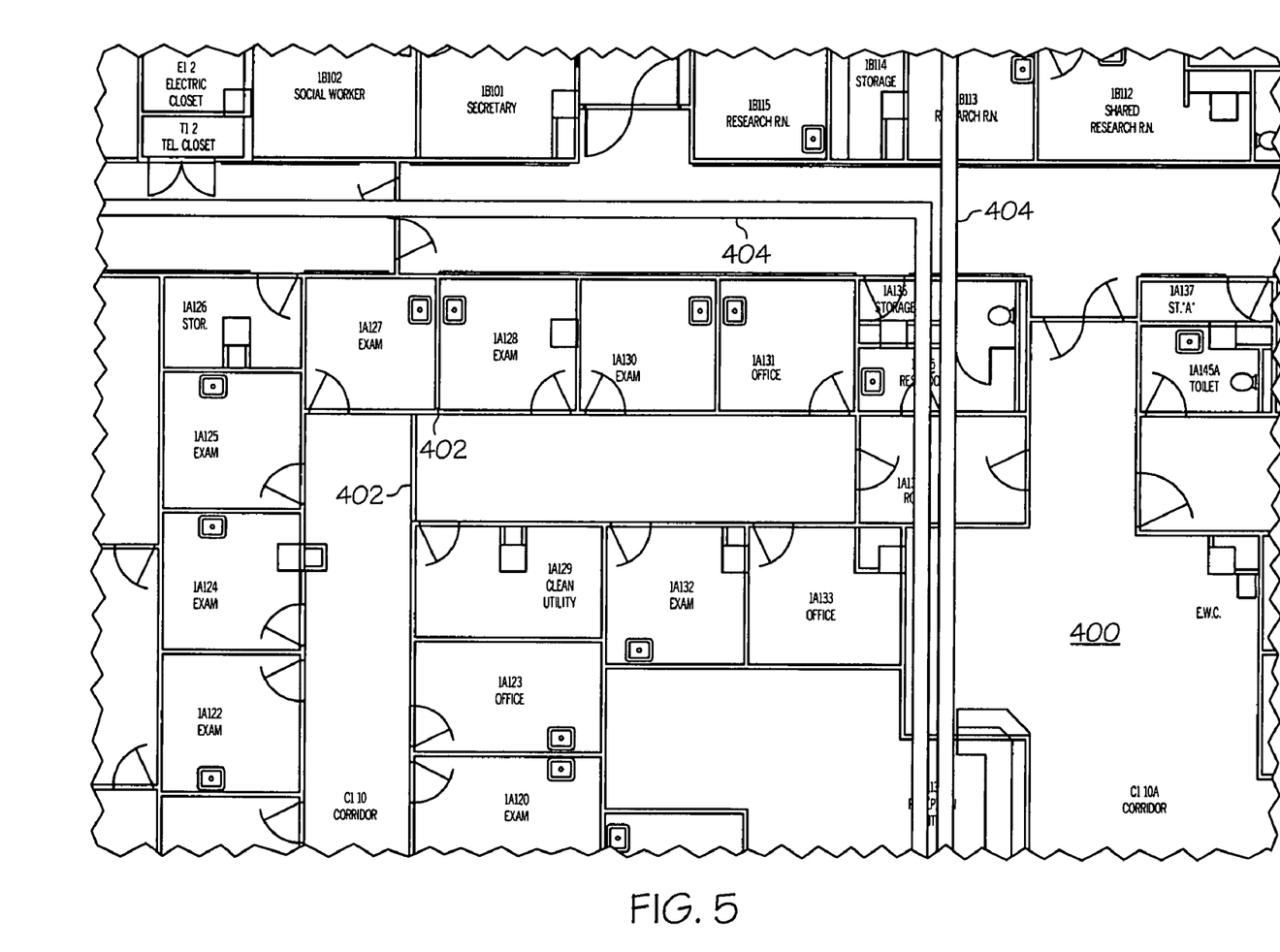
FIG. 5 shows a floor plan displaying zones and boundaries.

FIG. 5 shows vector floor plan 400 where zones 404 and Room boundaries 402 are displayed. Zones 404 and Room boundaries 402 used by central computer 125 assist in displaying the location of a transponder 102. Vector floor plan 400 utilizes intelligent Room boundaries 402. For example: The boundaries of rooms are outlined and their respective Room Number and Room Name are attached to that boundary 402, in the example provided it would be Room Number: 126, Room Name: Office. When a transponder 102 is detected in an area, the software on central computer 125 quickly looks to see which Room boundary 402 it falls within, the Room Number and Room Name are taken from the boundary information and reported to central computer 125. That information is used for either visual display of the queried transponder 102 or textual display of the Room Number and Name on hand held device 128 (e.g. PDA, portable laptop, etc.).

In addition to Room boundaries 402, zones 404 are also recognized that may surround a group of Room boundaries 402 (e.g. a zone might be the Radiology Department or the Emergency Department). When an object moves from zone to zone, certain business rules can be attached. For example: When the object is moving within it's safe zone, it appears on the display colored 'Green', in a Caution Zone, it would show 'Yellow', and when in a Danger Zone (e.g. moving out the door of the facility), it will be displayed in Red, blinking, and possibly an alert will be triggered. Another potential use for zone recognition might for lease responsibility of objects (assets). In short: boundary recognition will allow textual display of the locations of transponders 102 even if readers are not within those particular rooms (e.g. readers are spread apart at 40' to 60' intervals). Reflecting this information textually accommodates devices that don't have the ability to show location graphically.

Once a CAD drawing has been created with Room Boundaries 402 and zones 404, a program looks at the room and zone boundaries within the CAD drawing file and creates a data dictionary of all of the XY vertices and the associated Room/Zone boundary labels. This dictionary file is saved in an XML format and is the basis for being able to intelligently calculate the boundaries fast enough to report the information back to central computer 125 for display on hand held devices 128, displays 126, etc.—seconds as opposed to minutes. There are also tools that automatically update the XML file, with boundaries and associated labels, each time there's a change to the floor plan, which eliminates a manual redraw of the complete floor plan.

Furthermore, boundary recognition can also be integrated with camera coverage. Camera coverage areas are demarked on a CAD drawing (in scale) as boundaries. Each boundary has a camera number and it's respective stop point as a zone label. Some cameras may have five stop points or greater (e.g. those that provide 180 or 360 degrees of coverage). Each stop point is linked to a boundary in the CAD file so that when a transponder is triangulated within the coverage of a camera, that zone is quickly identified and the camera quickly moves to that zone for instant visual verification.

Additionally, there may be a History trace for every movement of objects (e.g. assets, staff, or patients). When the trace is turned on, a path is displayed that reflects the history of movement for that particular transponder 102 within a given period. The end-user will be able to click on any vertex on that path to see a Date and Timestamp for that particular transponder's movement history. Additionally, object-tracking system 100 may have the ability to track various boundaries around a bed. For example: Using IR Readers 121, a 5 foot (or less) threshold boundary around a bed may be set up and not only accurately reflect which patient is in that bed, but also, which staff are working with that patient (within the 5 foot boundary). When the staff moves to the next bed within the same room, the staff's time with the other patient within that room will be captured. This permits the differentiating of patient/bed information within a room that has no walls or fixed partitions.

Figure 6:
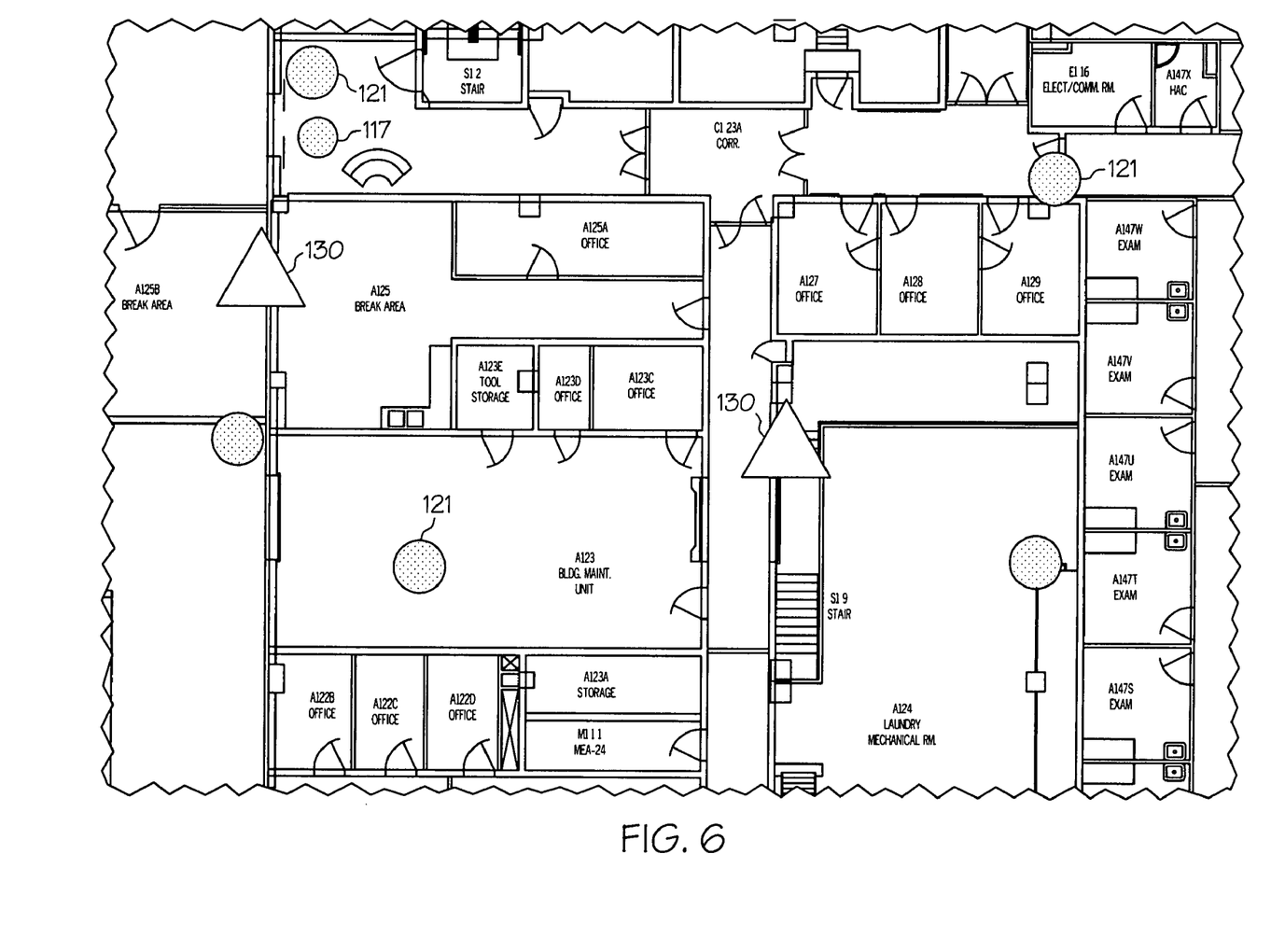
FIG. 6 shows a floor plan with beacon transponders for calibration purposes.

FIG. 6 shows a floor plan that utilizes beacon transponders 130. In the example, beacon transponders 130 work to calibrate the RF signal strength picked up by each of the RF readers 117. Beacon transponders 130 are strategically placed within groupings of RF readers 117 (or near a RF reader 117 that is outside the groups' range) at a fixed distance from each RF reader 117. The triangulation algorithm looks at the signal strength between each RF reader 117 and assigned beacon transponder 130 to adjust for environmental changes (e.g. moisture, density of equipment or personnel in a given area, noise generated by mobile RF equipment, etc.). In this way, our baseline for the triangulation is calibrated every minute to accommodate RF anomalies generated by the above circumstances. In this example, shown IR readers 121 are used strictly for floor-to-floor logic. Preferably, LF readers would be placed at each exit/entrance for floor-to-floor logic and tag direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for tracking objects comprising:
   a transponder attached to an object, wherein said transponder emits RF signals, LF signals, and infra-red signals;
   a RF signal reader for detecting emitted RF signals;
   a LF signal reader for detecting emitted LF signals;
   an infra-red signal reader for detecting emitted infra-red signals; and
   a computer enabled to receive transmissions from said RF signal reader, said LF signal reader, and said infra-red signal reader, wherein said computer uses said transmissions to triangulate a location of said object in an area.

2. The system for tracking objects of claim 1, further comprising a display for displaying said location of said object in said area.

3. The system for tracking objects of claim 2, wherein said display comprises a vector floor plan of said area.

4. The system for tracking objects of claim 1, wherein said computer further uses said transmissions to indicate a boundary in said area.

5. The system for tracking objects of claim 4, wherein said computer further uses said transmissions to indicate a zone in said area.

6. The system for tracking objects of claim 5, wherein said boundary is within said zone within said area.

7. The system for tracking objects of claim 1, further comprising a hand-held device enabled to receive transmissions from said computer.

8. The system for tracking objects of claim 1, wherein said computer is a hand-held device.

9. The system for tracking objects of claim 1, wherein said object is one of a group consisting of staff, patients, and equipment in a hospital.

10. The system for tracking objects of claim 1, wherein said object is an inventory item.

11. A system for tracking objects comprising:
transmitting means attached to an object for emitting RF signals, LF signals, and infra-red signals;
RF signal detecting means for detecting emitted RF signals;
LF signal detecting means for detecting emitted LF signals;
infra-red signal detecting means for detecting emitted infra-red signals;
transmission means for transmitting detected signals from said RF signal detecting means, said LF signal detecting means, and said infra-red signal detecting means to a computer; and
triangulation means for triangulating said detected signals to determine a location of an object within an area.

12. The system for tracking objects of claim 11, further comprising a display means for displaying said location of said object within said area.

13. The system for tracking objects of claim 12, wherein said display means is a vector floor plan.

14. The system for tracking objects of claim 11, further comprising boundary recognition means to indicate boundaries in an area.

15. The system for tracking objects of claim 14, further comprising a step of recognizing a zone in said area.

16. The method for tracking objects of claim 15, wherein said boundary is within said zone with in said area.

17. The system for tracking objects of claim 11, further comprising a hand-held device enabled to receive transmissions from said computer.

18. The system for tracking objects of claim 11, wherein said computer is a hand-held device.

19. The system for tracking objects of claim 11, wherein said object is one of a group consisting of staff, patients, and equipment in a hospital.

20. The system for tracking objects of claim 11, wherein said object is an inventory item.

21. A method for tracking objects comprising the steps of:
attaching a transponder to an object, wherein said transponder emits RF signals, LF signals, and infra-red signals;
providing a RF signal readers for detecting emitted RF signals in an area;
providing a LF signal reader for detecting emitted LF signals in said area;
providing an infra-red signal reader for detecting emitted infra-red signals in said area;
detecting a signal emitted from said transponder at a plurality of readers;
transmitting data indicating a detected signal from said plurality of readers to a computer; and
triangulating a location of said object using said data transmitted to said computer.

22. The method for tracking objects of claim 21, further comprising a step of displaying said location of said object on a display.

23. The method for tracking objects of claim 22, wherein said display comprises a vector floor plan.

24. The method for tracking objects of claim 21, further comprising a step of recognizing a boundary in said area.

25. The method for tracking objects of claim 24, further comprising a step of recognizing a zone in said area.

26. The method for tracking objects of claim 25, wherein said boundary is within said zone with in said area.

27. The method for tracking objects of claim 21, further comprising transmitting said location of said object to a hand-held device enabled to receive transmissions from said computer.

28. The method for tracking objects of claim 21, wherein said computer is a hand-held device.

29. The method for tracking objects of claim 21, said object is one of a group consisting of staff, patients, and equipment in a hospital.

30. The method for tracking objects of claim 21, wherein said object is an inventory item.

31. A system for tracking objects comprising:
a transponder attached to an object, wherein said transponder emits RF signals, LF signals and infra-red signals;
a RF signal reader for detecting emitted RF signals;
a LF signal reader for detecting emitted LF signals
an infra-red signal reader for detecting emitted infra-red signals;
a computer enabled to receive transmissions from said RF signal reader, said LF signal reader and said infra-red signal reader to determine a location of said object; and
said computer further comprising boundary recognition means for determining a location of said object.

32. The system for tracking objects of claim 31, wherein said computer uses said transmissions to triangulate a location of said object in an area.

33. The system for tracking objects of claim 31, wherein said computer further comprises zone recognition means for determining a location of said objects.

34. The system for tracking objects of claim 31, further comprising a display for displaying said location of said object in said area.

35. The system for tracking objects of claim 34, wherein said display comprises a vector floor plan of said area.

* * * * *